(12) United States Patent  (10) Patent No.: US 6,676,101 B2
Platus                      (45) Date of Patent:   Jan. 13, 2004

(54) VIBRATION ISOLATION SYSTEM

(75) Inventor: David L. Platus, Santa Monica, CA (US)

(73) Assignee: Minus K. Technology, Inc., Inglewood, CA (US)

( * ) Notice: Subject to any disclaimer, the term of this patent is extended or adjusted under 35 U.S.C. 154(b) by 0 days.

(21) Appl. No.: 10/156,274

(22) Filed: May 28, 2002

(65) Prior Publication Data

US 2003/0222194 A1 Dec. 4, 2003

(51) Int. Cl.$^7$ ................................. F16F 13/00
(52) U.S. Cl. ................. 248/603; 248/566; 248/575; 248/619; 267/140.11; 267/140.3
(58) Field of Search ................. 248/565, 566, 248/575, 576, 603, 604, 619, 620, 621, 618, 638, 564; 267/140.12, 140.13, 140.2, 140.3, 140.4, 140.5, 140.11; 52/167.1, 167.3, 167.7, 167.8

(56) References Cited

U.S. PATENT DOCUMENTS

| | | | | |
|---|---|---|---|---|
| 2,289,854 A | * | 7/1942 | Permann et al. | 248/595 |
| 2,756,952 A | * | 7/1956 | Gazley | 248/567 |
| 3,373,962 A | * | 3/1968 | Blaiklock et al. | 248/621 |
| 3,690,607 A | * | 9/1972 | Mard | 248/550 |
| 4,731,966 A | * | 3/1988 | Fujita et al. | 52/167.1 |
| 5,030,876 A | * | 7/1991 | EerNisse | 310/353 |
| 5,178,357 A | | 1/1993 | Platus | 248/619 |
| 5,310,157 A | | 5/1994 | Platus | 248/619 |
| 5,370,352 A | | 12/1994 | Platus | 248/619 |
| 5,390,892 A | | 2/1995 | Platus | 248/619 |
| 5,452,548 A | * | 9/1995 | Kwon | 52/167.8 |
| 5,529,277 A | * | 6/1996 | Ostaszewski | 248/603 |
| 5,549,270 A | | 8/1996 | Platus et al. | 248/619 |
| 5,669,594 A | | 9/1997 | Platus et al. | 248/619 |
| 5,813,650 A | * | 9/1998 | Tsukamoto et al. | 248/638 |
| 5,833,204 A | | 11/1998 | Platus et al. | 248/619 |
| 6,094,800 A | * | 8/2000 | Gutelius et al. | 29/525.01 |

FOREIGN PATENT DOCUMENTS

| | | | | |
|---|---|---|---|---|
| DE | | 1775472 B2 | * 3/1978 | 248/565 |
| JP | | 403125049 A | * 5/1991 | 248/638 |

* cited by examiner

*Primary Examiner*—Leslie A. Braun
*Assistant Examiner*—Jon Szumny
(74) *Attorney, Agent, or Firm*—Fulwider Patton Lee & Utecht, LLP

(57) ABSTRACT

A horizontal-motion vibration isolation system for supporting an object in an equilibrium position relative to a base while suppressing the transmission of horizontal vibratory motion between the object and the base includes a plurality of columns, each column having a rigid member with a first end and a second end. A tilt mechanism is operatively connected to each first end of the rigid members and the object. Likewise, a tilt mechanism is operatively connected to each second end of the rigid members and the base. Each tilt mechanism exhibits a tilt rotational stiffness and the horizontal translation of the object relative to the base causes tilt rotation of the columns. The tilt rotational stiffness of the tilt mechanisms is approximately proportional to the compression load transmitted to the columns by the weight of the object, so that the horizontal natural frequency of the system is nearly insensitive to the payload weight. The tilt mechanism can be made from a plurality of tension members which are relatively stiff in axial tension and relatively flexible in bending. For example, the tension members can be made from thin wires, strings, filaments, cables, thin and narrow sheet metal strips or other sheet material. Alternatively, each tilt mechanism can be made with an end fitting that presses into a relatively deformable pad. The end fitting has a contoured shape so that as the weight load on the column increases, the contact area between the fitting and the deformation of the pad increases. Other tilt mechanisms include the use of a non-linear spring or a plurality of non-linear springs.

20 Claims, 6 Drawing Sheets

VIBRATION ISOLATION SYSTEM

BACKGROUND OF THE INVENTION

1. Field of the Invention

This invention relates generally to suspension systems and methods for isolating and reducing the transmission of vibratory motion between an object and a base. More particularly, the present invention is directed to a novel and improved horizontal-motion vibration isolation system that is nearly insensitive to the payload weight and can attain low natural frequencies. Additionally, this improved horizontal-motion vibration isolation system can be made fully adjustable and offers improved horizontal-motion performance while passively accommodating changes in payload weight and maintaining a low horizontal natural frequency. The vibration isolation system of the present invention also can be configured in a low profile without compromising horizontal-motion performance.

2. Description of Related Art

The problems caused by unwanted vibration on equipment, devices and processes that are extremely motion sensitive have been widely researched and numerous solutions to prevent or reduce the transmission of such vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices. There are, however, shortcomings and disadvantages associated with these particular isolation systems which prevent them from obtaining low system natural frequencies and from limiting resonant responses to low values while providing high isolation performance at higher frequencies.

The shortcomings and disadvantages of prior systems were addressed through my development of the novel vibration isolation systems and novel devices and methods shown and described in U.S. Pat. Nos. 5,310,157, 5,370,352, 5,178,357, 5,390,892, 5,549,270, 5,669,594 and 5,833,204, which are all hereby incorporated by reference. The particular vibration isolation systems described in these patents provide versatile vibration isolation by exhibiting low stiffness in an axial direction (generally in the direction of the payload weight) and any direction substantially transversed to the axial direction (generally a horizontal direction), and may provide tilt or rotation about three mutually perpendicular axes. These systems utilize a combination of uni-directional or bi-directional isolator subassemblies that can be connected together in series-fashion to provide omni-directional isolation. Each isolator is designed to isolate the axial or transverse component of any vibratory translation to effectively isolate vibrations along or about any directional axes.

These isolators rely on a particular principle of loading a particular elastic structure which forms the isolator or portion of it (the loading being applied by either the supported weight or by an external loading mechanism) to approach the elastic structure's point of elastic instability. Some of my previous horizontal-motion isolation systems covered under U.S. Pat. Nos. 5,310,157, 5,370,352, 5,549,270, and 5,669,594 utilize a set of beam-columns, connected between upper and lower column plates, and loaded by the payload weight to approach the "critical buckling load" of the column. The critical buckling load is the load on the column at which the horizontal stiffness of the column is substantially reduced and approaches zero stiffness when the columns are loaded above their critical buckling load, the system becomes unstable. When the columns are loaded slightly below their critical buckling load, the horizontal stiffness and horizontal natural frequency are very low. While stiffness is greatly reduced, the columns still retain the ability to support the payload weight.

These critical buckling loads do not change significantly with changes in payload weight so that any substantial change in payload weight can cause changes in the horizontal stiffness and the horizontal natural frequencies of the isolation system. This results in a limited range of payload weight for which low horizontal natural frequencies can be achieved, e.g., 0.5 Hz or less. Also, the range of payload weight will decrease as the columns decrease in height These limitations were addressed in my previous horizontal-motion vibration isolation systems described, for example, in U.S. Pat. Nos. 5,178,357 and 5,390,892.

Accordingly, those concerned with the development and use of vibration isolation systems and apparatus recognize the need for improved systems and apparatus for achieving a horizontal-motion vibration isolation system having a horizontal natural frequency that can be made very low and that is nearly insensitive to changes in payload weight. The present invention satisfies these and other needs.

SUMMARY OF THE INVENTION

The present invention provides a horizontal-motion vibration isolation system that can attain low horizontal natural frequencies and is nearly insensitive to changes in payload weight. In the present invention, the critical buckling load of a column and the horizontal stiffness of the column are approximately proportional to the payload weight supported by the column. Through proper selection of the column parameters, the critical buckling load will remain slightly above the load on the column so that low horizontal natural frequencies result that remain nearly constant even as the payload weight changes. This feature allows the use of smaller column heights for achieving a wider range of payload weight for which the very low horizontal natural frequencies can be achieved.

The present invention includes a set of columns connected between upper and lower members, such as the upper and lower column plates or platforms. Each column of the present invention is a relatively rigid member connected to an upper plate and a lower plate by tilt mechanisms having a stiffness for tilt rotation about any horizontal axis. This tilt rotational stiffness is nearly proportional to the weight load carried by the column. Further, the column parameters can be selected so that the critical buckling load remains slightly above the load on the column, independent or nearly independent of the load on the column. Also, the length of the column can be adjusted, thereby changing the critical buckling load and horizontal natural frequency of the system.

There are various ways to achieve the column behavior and the resulting performance of the horizontal-motion vibration isolation system of the present invention. In one embodiment, a set of columns is connect between an upper plate and a lower plate. Each column comprises a threaded rod, with disks having central holes to accommodate the rod attached near its upper and lower ends with two lock nuts. A set of equally spaced tension members is connected at the outer edge of the upper disk and extends radially outward at some non-zero angle with the horizontal. These tension members are attached to an inner edge of a circular cutout in the upper plate. Another set of equally-spaced tension members is connected at the outer edge of the lower disk which also extends radially outward at some non-zero angle with the horizontal and are attached at the inner edge of a circular cutout in the lower plate. The tension members are very stiff in axial tension and very flexible in bending and torsion. The weight load from the payload and the upper plate loads the columns in compression and produces tension loads in the tension members. The upper set of tension members connected between the upper disk and the upper plate and the lower set of tension members connected between the lower disk and the lower plate also act as tilt rotational springs and produce resisting moments when the upper plate is translated in any horizontal direction relative to the lower plate. Since the bending and twisting stiffness of the tension elements is very small compared with the axial stiffness, this tilt rotational stiffness results primarily from the tension in the tension members. Further, since the tension in the tension members is proportional to the weight load on the column, the tilt rotational stiffness is therefore primarily a result of the weight load on the column.

As will be shown later with the aid of figures and a moment balance, a column behaving as a rigid member connected to upper and lower plates by tilt rotational springs having a stiffness proportional to the weight load on the column attains a critical buckling load that is proportional to the weight load on the column and is inversely proportional to the column's length. Such a column also would have a horizontal stiffness that is proportional to the weight load on the column. A horizontal-motion vibration isolation system constructed from a set of such columns would have a natural frequency that is independent of the weight load and, by proper selection of the tilt rotational stiffness, the natural frequency can be made very low. It will also be shown with the aid of figures that this particular embodiment of the present invention approximates this behavior and that the proportionality constant between the tilt rotational stiffness and the weight load on the column is a function of the diameter of the disks and the angle the tension members make with the horizontal. Therefore, by proper selection of the disk diameter, along with the angle that the tension members make with the horizontal, and the column length, a column can be made so that the horizontal-motion vibration isolation system has a natural frequency that is nearly independent of the payload weight and can be made very low. Further, the natural frequency can be fully adjusted through the adjustment of the length of the column.

If these tension members elongate significantly as a result of the tension force, the angle that the tension members make with the horizontal, and hence the tilt rotational stiffness, will change with the payload weight. Therefore, the tension members should be very stiff in tension so their elongation under load is minimized, and they should also be very flexible in bending and twisting so that the tilt rotational stiffness is due primarily to the tension in the tension members and, hence, the weight load. Various elements can be used for the tension members, including, but not limited to, thin wires, strings, filaments, cables, thin and narrow sheet metal strips or other structural sheet material. The set of tension members can also be constructed as an integral member such as a wire mesh or an integral sheet metal stamping in the form of an inner and an outer ring connected by multiple thin radial elements.

Only three tension members with substantially equal angular spacing are actually needed to provide omnidirectional behavior, i.e., the same stiffness behavior in any horizontal direction. Multiples of three tension members, such as six or more, can also be used and when more than a few equally spaced members are used, the behavior should be approximately omnidirectional, independent of the number of tension members.

In another embodiment of the invention, a set of columns having relatively rigid members is connected between upper and lower column plates and the tilt rotational stiffness at the connections is provided by end fittings on the rigid members that are pressed into relatively deformable pads by the weight load on the column. Relative horizontal translation between the column plates causes tilting rotation of the column and deformation of the pads that produces a moment resisting the tilt rotation. The tilt rotational stiffness is equal to this moment divided by the tilt angle. The end fittings have a conical or other contoured shape so that as the weight load on the column increases, the contact area between the end fitting and the deformation of the pad increases. This increased contact area and deformation causes an increase in the tilt rotational stiffness. By proper selection of the shape of the pad, the shape of the end fitting contour and the material properties of the pad, the tilt rotational stiffness can be made approximately proportional to the weight load on the column. Various materials can be used for the pads. Examples are natural rubber, Neoprene and other rubber-like materials, metallic meshes and combinations of materials.

In one particular embodiment of the end fittings have threaded holes and screw on to a rod that has right-handed and left-handed threads at the ends. The spacing of the end fittings, and therefore the effective length of the column, can be changed by turning the rods. The pads are bonded to the column plates and mating protrusions on the end fittings and recesses in the pads anchor the end-fittings in the pads.

In another embodiment, the column assemblies are comprised of threaded rods with right-handed and left-handed threads at each end that screw into threaded fittings that connect to tapered coil springs connected to the upper and lower column plates. There are recesses in the column plates for locating the tapered coil springs. The weight loads on the columns compress the tapered springs. Increasing the weight loads on the tapered springs increase both the axial stiffness and the tilt rotational stiffness of the tapered springs by causing the larger more flexible coils to bottom out on adjacent coils or on the supporting surfaces of the column plates, thereby increasing both the axial and the tilt stiffness of the springs. By proper design of the tapered springs, the tilt rotational stiffness can be made approximately proportional to the weight load on the column. The tapered spring design variables include the material, wire diameter, small coil diameter, large coil diameter, number of coils, free length, axial spacing of the coils and diameters of the coils.

In another embodiment of the invention similar to the previous embodiment, three tapered coil springs spaced at 120 degrees are pressed between each end fitting and the column plate. There are recesses in the end fittings and in the column plates for housing the springs. The tilt rotational stiffness in this embodiment is a function of the axial and the tilt rotational stiffness of the tapered springs and their radial distance from the center of the threaded rod. By proper selection of the radial position and design of the tapered springs the tilt rotational stiffness can be made approximately proportional to the weight load on the column.

It is to be understood that the present invention is not limited by the embodiments described herein. Other features and advantages of the present invention will become more apparent from the following detailed description of the invention, when taken in conjunction with the accompanying exemplary drawings.

DETAILED DESCRIPTION OF THE PREFERRED EMBODIMENTS

Figure 1:
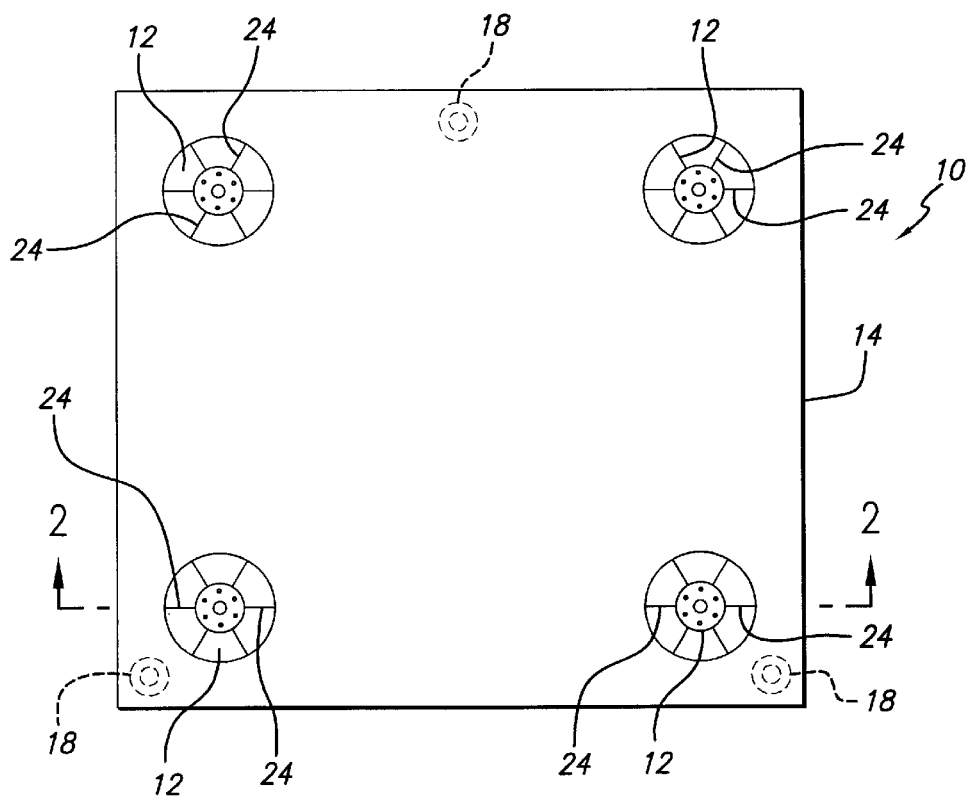
FIG. 1 is a plan view of a horizontal-motion vibration isolation system made in accordance with the present invention.

Turning now to the drawings, in which like reference numerals represent like or corresponding elements in the drawings, FIG. 1 illustrates one particular embodiment of a horizontal-motion isolation system 10 that is capable of providing low horizontal natural frequencies and passively accommodating changes in payload weight while maintaining the low horizontal natural frequencies. The present invention is also directed to the individual column assemblies that are used in the present isolation system. As the present invention is described in detail as applied to the horizontal-motion isolation system shown in FIG. 1, those skilled in the art will appreciate that these improvements can be used in conjunction with other isolation systems as well. In particular, it can be used in conjunction with all of the six-degree-of-freedom isolation systems of my previous inventions described in U.S. Pat. Nos. 5,310,157, 5,370,352, 5,549,270, and 5,669,594.

Figure 2:
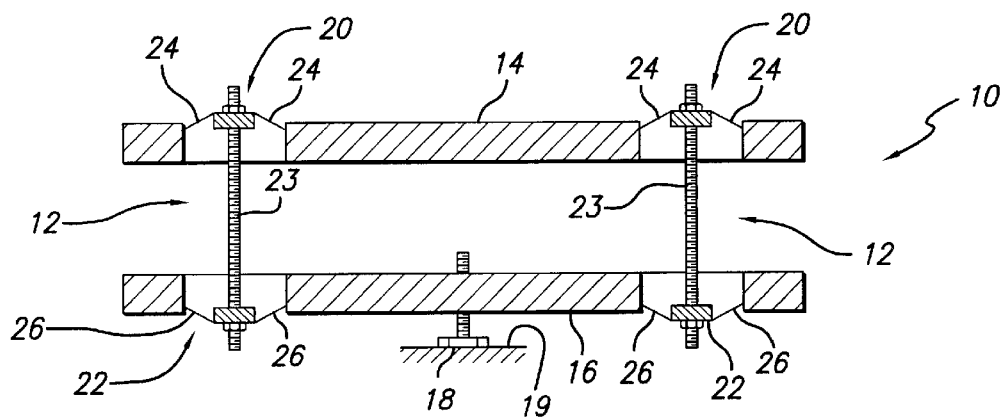
FIG. 2 is partial cross-sectional side view of the embodiment shown in FIG. 1 taken along the line 2—2.

FIGS. 1 and 2 show one particular embodiment of a vibration isolation system 10 made in accordance with the present invention. The system 10 uses several novel column assemblies 12 that are connected between an upper plate 14 and a lower plate 16, also referred to as platforms. The upper plate or platform 14 supports the payload (not shown) and the lower plate or platform 16 is supported on three leveling screws 18, only one of which is shown in FIG. 2. The leveling screws 18 support the isolation system on a vibrating surface 19 (depicted in FIG. 2). The column assemblies 12 act in combination to provide a horizontal spring behavior between the upper plate 12 and the lower plate 14 for displacement of the upper plate in any horizontal direction relative to the lower plate. Further, in accordance with the present invention, the rotational stiffness of the column assembly 12 can be made very low. This stiffness and the mass of the payload and the upper plate 14 constitute a single-degree-of-freedom spring-mass system which, in accordance with the present invention, can provide low natural frequencies and thereby attenuate higher frequency vibrations between the vibrating surface and the payload, according to well-known passive vibration isolation theory. Further, as will be shown below, the horizontal natural frequency of the vibration isolation system 10 will remain nearly constant for substantial variations in the payload weight.

Referring specifically now to FIGS. 1 and 2, the column assembly 12 includes an upper tilt mechanism 20 and a lower tilt mechanism 22 connected to a threaded rod 23, which acts like a column. The upper tilt mechanism 20 is connected to the upper plate 14 through six equally spaced tension members 24 and the lower tilt mechanism 22 is connected to the lower plate 16 through six equally spaced tension members 26. The upper tilt mechanism of the column assembly 12 is shown in greater detail in FIGS. 4 and 5. Both the upper tilt mechanism 20 and the lower tilt mechanism 22 can be identically constructed so the details of the upper tilt mechanism given in FIGS. 4 and 5 also apply to the lower tilt mechanism. The upper tilt mechanism 20 comprises a disk 28 with a central hole 30 for the threaded rod 23, a washer-like nut 32 with holes for screws 34 and a rib 36 that protrudes into a groove 38 in the disk 28, thereby clamping the tension members 24 with screws 34 between the washer-like nut 32 and the disk 28. The disk 28 is clamped to the threaded rod 23 by two lock nuts 40. The outer ends of the tension members 24 are connected to the upper plate 14 in a manner similar to their connection to the disk 28. They are clamped with screws 46 between a washer-like nut 44 and the upper plate 14 with the help of a rib 42 that protrudes into a groove 48 in the upper plate 14.

Each tension member 24 makes an angle relative to the horizontal that is determined by the length of the tension member and the radial spacing between the upper tilt mechanism 20 and the upper plate 14. Similarly, each tension member 26 makes an angle relative to the horizontal that is determined by the length of the tension member and the radial spacing between the lower tilt mechanism 22 and the lower plate 16. The tension members 24 and 26 are designed to be substantially stiff in axial tension while being significantly flexible in bending and torsion. The weight load transmitted between the upper plate 14 and the lower plate 16 through the column assembly 12 creates and imparts tension to each of the tension members 24 and 26 and the amount of tension depends on the angle the tension members make with the horizontal. Horizontal translation of the upper plate 14 relative to the lower plate 16 causes tilting of the column assembly 12 and this tilting is resisted by the deformation of the tension members 24 and 26, which produces a spring-like behavior. Since the bending and twisting stiffness of the tension elements 24 and 26 is very small compared with their axial stiffness, the tilt rotational stiffness of the column assembly 12 is due primarily to the tension in the tension elements 24 and 26. Since, further, the tension in the tension elements 24 and 26 is proportional to the weight load on the column assembly 12, the tilt rotational stiffness will therefore be primarily due to the weight load on the column assembly 12. This will be explained in greater detail below.

Figure 3A:
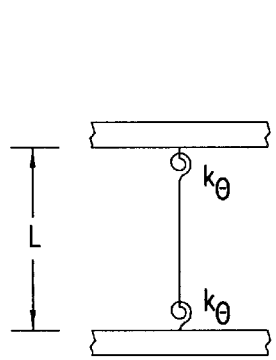
FIG. 3a is a schematic representation of a column.
Figure 3B:
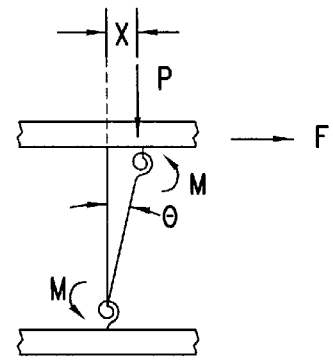
FIG. 3b shows the forces acting on the column of FIG. 3a with a small displacement.

The schematic models of FIG. 3a and FIG. 3b represent the behavior of the column assembly 12. FIG. 3a and FIG. 3b represent one column in a horizontal-motion vibration isolation system comprising an upper plate and a lower plate connected by several columns assemblies. FIG. 3a comprises a rigid member connected between the upper and lower plates by rotational tilt springs having a stiffness $k_\theta$ for tilt rotation about any horizontal axis. FIG. 3b shows the column of FIG. 3a supporting the weight load P with the upper plate is displaced a small horizontal distance x relative to the lower plate. The horizontal force on the column required to produce this displacement is F and the horizontal stiffness is F/x. The column is tilted a small angle $\theta$ equal to x/L and resisting moments M equal to $k_\theta\theta$ act on the upper and lower ends. As will be shown below, by making the tilt rotational stiffness $k_\theta$ proportional to the load P in accordance with the present invention, the horizontal natural frequencies of a system comprising several such columns will be insensitive to the load P. Further, the proportionality constant between $k_\theta$ and P can be selected so the natural frequencies of the system are made very low.

Referring to FIG. 3b, a moment balance gives $$FL+Px=2M=2\,k_\theta\theta=2\,k_\theta x/L \quad (1)$$

or, rearranging and dividing by L, $$F=2\,k_\theta x/L^2-Px/L. \quad (2)$$

Dividing by x gives the horizontal stiffness for the column, $$k=F/x=2\,k_\theta/L^2-P/L. \quad (3)$$

The critical buckling load $P_C$ is the load P at which the stiffness k is zero, and from Eq. (3), $$P_C=2\,k_\theta/L. \quad (4)$$

Substituting Eq. (4) into Eq. (3) gives $$k=(P_C-P)/L. \quad (5)$$

If, according to the present invention, $k_\theta$ is made proportional to P, then $$k_\theta=AP, \quad (6)$$

where A is the proportionality constant, and with Eqs. (4) and (6), Eq. (5) can be written $$k=P(2A/L-1)/L. \quad (7)$$

Thus, if $k_\theta$ is made proportional to P then k is also proportional to P, according to Eq. (7). For a horizontal-motion vibration isolation system comprising several such columns, the horizontal stiffness of the system will be the product of k and the number of columns. Similarly, the total weight load on the columns will be the product of P and the number of columns. The natural frequency f of such a system is given by $$f=(kg/P)^{1/2}/2\pi, \quad (8)$$

where g is the gravitational constant. Substituting Eq. (7) into Eq. (8) gives $$f=[(2A/L-1)g/L]^{1/2}/2\pi. \quad (9)$$

Eq. (9) shows that f is independent of the weight load P and, by selecting the proportionality constant A so that 2A/L is slightly greater than 1, f can be made very small. Eq. (9) further shows that the frequency can be adjusted by adjusting the effective column length L.

Figure 4:
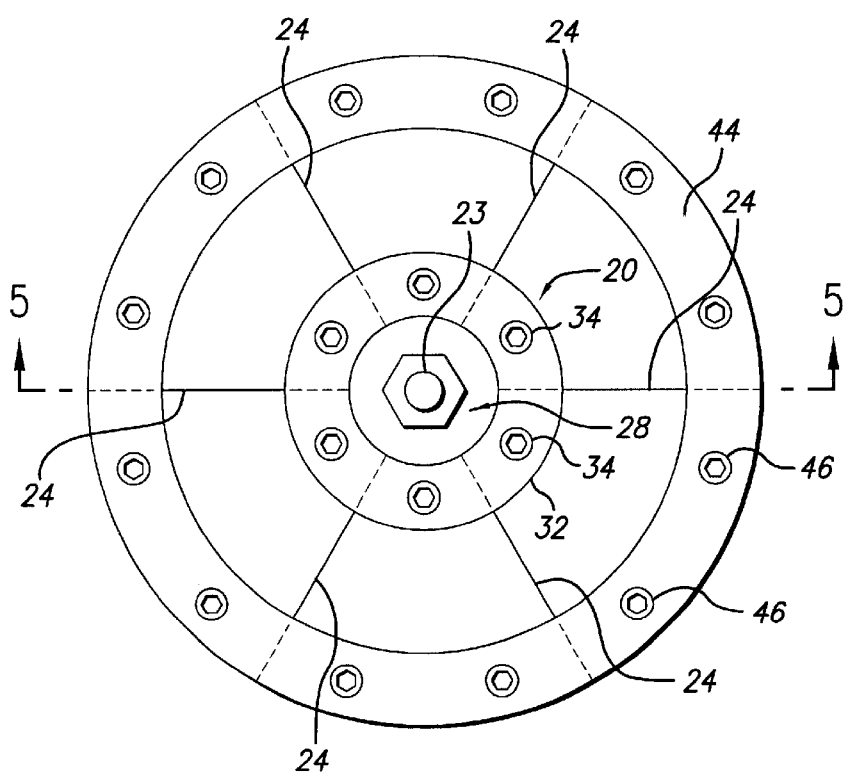
FIG. 4 is a plan view showing additional details of part of the isolation system of FIG. 1 encompassing one of the column assemblies and tilt mechanisms.
Figure 5:
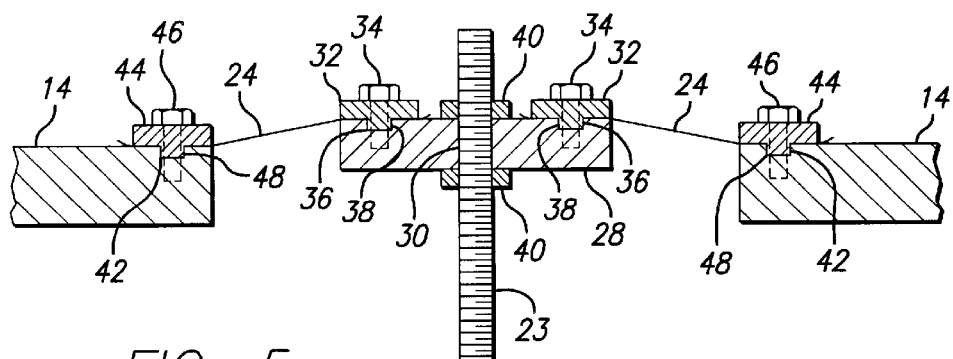
FIG. 5 is partial cross-sectional side view of the embodiment shown in FIG. 4 taken along the line 5—5.
Figure 6A:
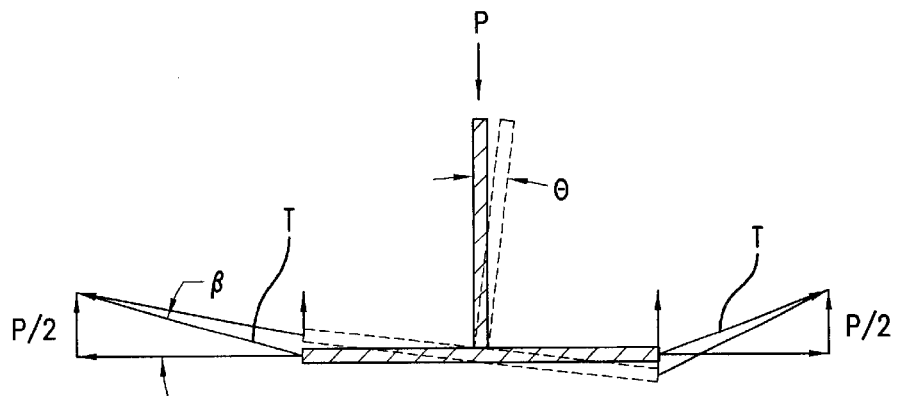
FIG. 6a shows a planar model of the forces on the lower end of one of the column assemblies of the present invention before and after it is given a small angular displacement.
Figure 6B:
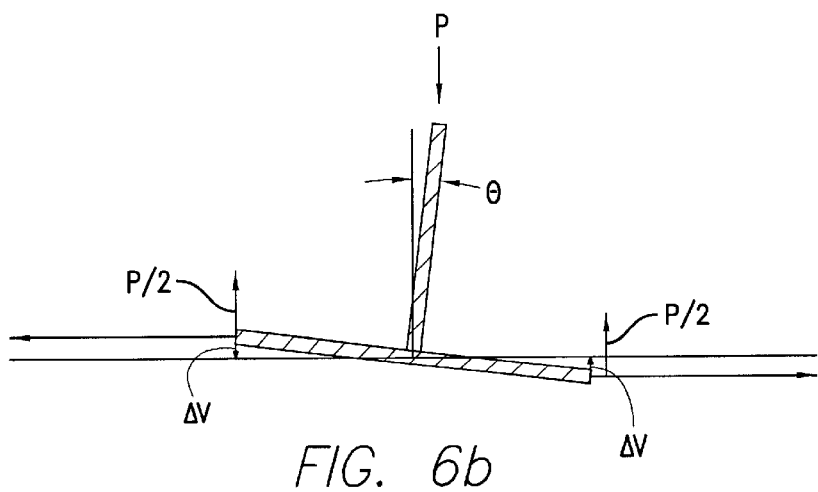
FIG. 6b is another representation of the forces of FIG. 6a after the column is given a small angular displacement.

Referring to FIGS. 6a and 6b, it will now be shown that the column assembly 12 shown in FIGS. 1, 2, 4 and 5 approximates the behavior of the model of FIGS. 3a and 3b, with $k_\theta$ approximately proportional to the weight load P. It will then follow from the mathematical development of Eqs. (1)–(9) that the horizontal-motion vibration isolation system 10 of FIGS. 1 and 2, made in accordance with the present invention, has a natural frequency that is nearly independent of the weight load, and that the frequency can be made very low. FIGS. 6a and 6b represent a schematic planar model of the lower end of the column assembly 12 shown in FIGS. 1 and 2. The tilt mechanism that exhibits tilt rotational stiffness can be seen from the sketches of FIGS. 6a and 6b that show the forces on the bottom of the column in this planar example. In this model only two tension members are considered which are in the plane of the paper and make an angle $\beta$ with the horizontal. FIG. 6a shows the column before and after it is tilted a small angle $\theta$. The two tension members are supporting the load P that produces a tension T in the tension members. Before the column is tilted the vertical component of T is P/2, as illustrated, and the horizontal components of T in the two tension members are in line and in opposite directions and cancel each other. The result of the force balance shows that there is no net moment on the bottom of the column.

FIG. 6a also shows the bottom of the column after it is tilted. As indicated, the angle $\beta$ of the left tension member is decreased and the angle $\beta$ of the right tension member is increased. Consequently, the vertical component of T in the left tension member is decreased and the vertical component of T in the right tension member is increased, also as shown in FIG. 6a. The forces on the tilted column are also shown in FIG. 6b. Here, the vertical components of the tension member forces acting on the column are broken into two components, the component P/2 in the case without tilt and a change in the vertical component $\Delta V$ that results from the tilting. For the right tension member $\Delta V$ is upward and adds to the component P/2. For the left tension member $\Delta V$ is downward and subtracts from P/2. The horizontal components of T acting on the column are also shown, and in this case they are not in line, as in the case without tilt. The result of this force balance clearly shows that there is a net counterclockwise resisting moment on the column due both to the vertical components and the horizontal components of the tension T. The moment due to the vertical components of T is approximately equal to the product of $\Delta V$ and the disk diameter, and the moment due to the horizontal components of T is the product of the horizontal component of T and the vertical displacement of the attach points of the tension members on the disk. This net resisting moment divided by the angle $\theta$ is the tilt rotational stiffness $k_\theta$.

It is apparent from studying FIGS. 4 and 5 in relation to FIGS. 6a and 6b that $k_\theta$ is due primarily to the number of tension members 24, the tension T in each tension member, the diameter of the disk 28, the angle $\beta$, and the length of the tension members, and that $k_\theta$ is nearly proportional to T. Since, however, T is equal to the load P divided by the product of the number of tension members 24 and the sine of $\beta$, $k_\theta$ is due primarily to only the load P, the diameter of the disk 28, the length of the tension members 24 and the angle $\beta$, and is also approximately proportional to P. For a given load P, increasing the diameter of the disk 28 increases $k_\theta$ and decreasing the angle $\beta$ or the length of the radial members 24 increases $k_\theta$. Since, according to Eq. 4 above, the critical buckling load is equal to $2k_\theta/L$, and since $k_\theta$ is nearly a function of only the diameter of the disk 28, the angle β, the length of the tension members and the load P, column parameters can be found by experiment and/or analysis so that P remains slightly below the critical buckling load for any load P. In other words, the proportionality constant A in Eq. (6) can be found so that 2A/L in Eq. (9) is slightly greater than 1. This results in a natural frequency f that is very low and is independent of P. This shows that a horizontal-motion vibration isolation system can be constructed in accordance with the present invention that has a low natural frequency and is relatively insensitive to the payload weight. Also, such a system can be constructed with a smaller height than the systems of my previous inventions. Even for small values of L the disk diameter and the angle β can be found that keeps P slightly below the critical buckling load.

If the tension members 24 and 26 elongate significantly as a result of the tension force, the angle β, and therefore $k_\theta$, will change with P. Therefore, the tension members should be very stiff in tension so their elongation under load is minimized, and they should also be very flexible in bending and twisting so that $k_\theta$ is due primarily to the tension T and, hence, the load P.

Figure 7:
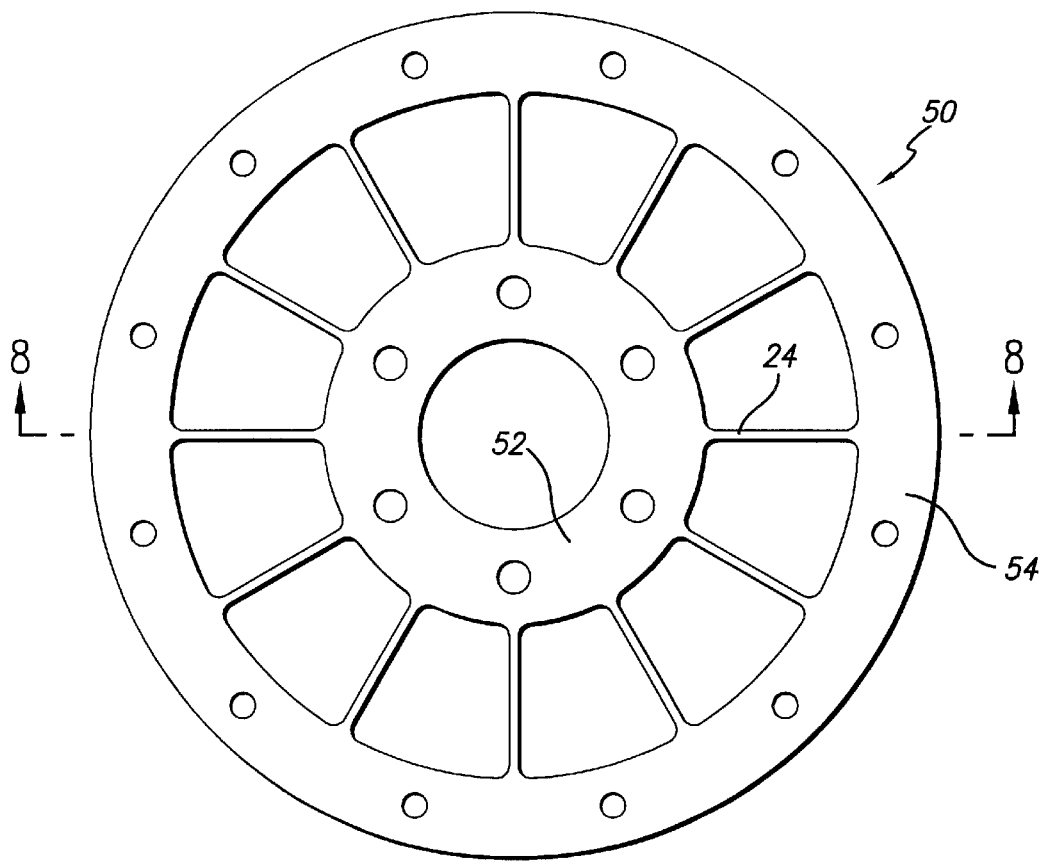
FIG. 7 is a plan view of an embodiment of an integrally formed set of tension members made in accordance with the present invention.
Figure 8:
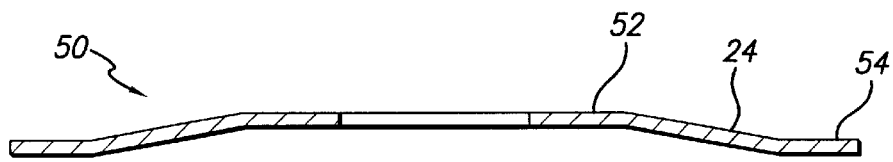
FIG. 8 is a cross-sectional side view of the part of the integrally formed set of tension members shown in FIG. 7.

Various elements can be used to form the tension members such as, but not limited to, thin wires, strings, filaments, cables, thin and narrow sheet metal strips. The particular isolation system configuration and construction methods illustrated in FIGS. 1–5 are just some of the many arrangements which can incorporate the novel features of the present invention. Other configuration and construction methods will become apparent to those skilled in the art. For example, referring now to FIGS. 7 and 8, the set of tension members 24 can also be constructed as an integral member 50, such as a wire mesh or an integral sheet metal stamped in the form of an inner ring 52 and an outer ring 54 connected by multiple thin radial elements which form the tension members 24.

Three tension members with substantially equal angular spacing generally can be used to provide omnidirectional behavior, i.e., the same stiffness behavior in any horizontal direction. Multiples of three such as six or nine tension members can also be used and when more than a few equally spaced members are used, the behavior of these multiple tension members will be approximately omnidirectional independent of the number of members.

Figure 9:
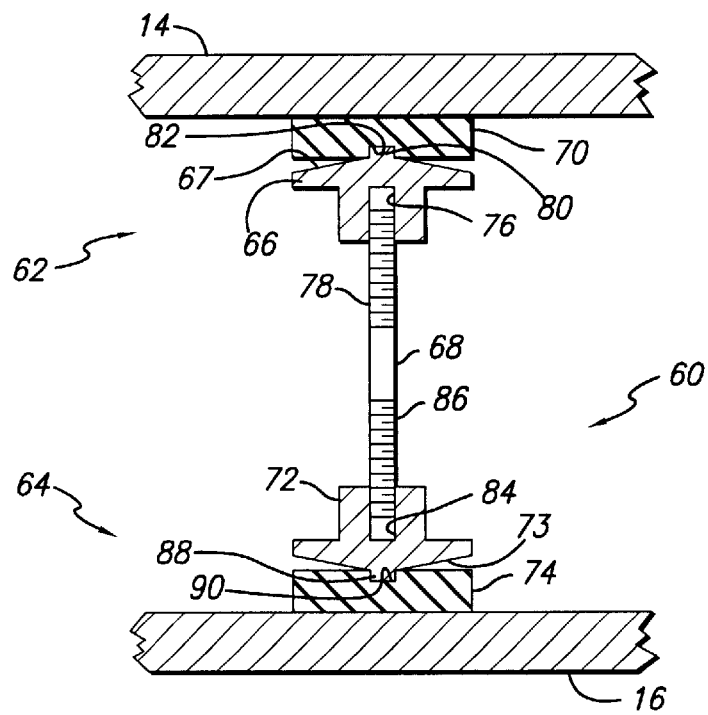
FIG. 9 is a cross-sectional side view of another embodiment of a column assembly and tilt mechanisms of the present invention.

The column assembly 60 shown in FIG. 9 is another embodiment of a column assembly that can be used in place of the column assembly 12 of the system 10 shown in FIGS. 1 and 2. The schematic models of FIGS. 3*a* and 3*b* also represent the behavior of the column assembly 60. The column assembly 60 includes an upper tilt mechanism 62 and a lower tilt mechanism 64. The upper tilt mechanism 62 comprises a relatively rigid fitting 66 that is connected to a threaded rod 68 and contacts a deformable pad 70 that is bonded to the upper column plate 14. The lower tilt mechanism 64 comprises a relatively rigid fitting 72 that is connected to the threaded rod 68 and contacts a deformable pad 74 bonded to the lower column plate 16. The fitting 66 has a threaded hole 76 that engages the upper threaded portion 78 of the threaded rod 68. It has a protrusion 80 that engages a recess 82 in the pad 70 for positioning the fitting 66 on the pad 70. The fitting 66 also has a contour 67 on the end that contacts the pad 70. The fitting 72 has a threaded hole 84 that engages the lower threaded portion 86 of the threaded rod 68. It also has a protrusion 88 that engages a recess 90 in the pad 74 for positioning the fitting 72 on the pad 74. Additionally, the fitting 72 has a contour 73 on the end that contacts the pad 74.

The threaded rod 68 acts as a column and transmits the weight load on the column assembly between the upper tilt mechanism 62 and the lower tilt mechanism 64. The upper threaded portion 78 of the threaded rod 68 is a right-hand thread and the lower threaded portion 86 is a left-hand thread, so by turning the threaded rod 68, the spacing between the upper tilt mechanism 62 and the lower tilt mechanism 64 can be changed, thereby changing the effective length of the column assembly 60. Horizontal translation of the upper column plate 14 relative to the lower column plate 16 causes tilting rotation of the column assembly and deformation of the pads 70 and 74 by the fittings 66 and 72. This deformation of the pads causes resisting moments on the upper and lower end fittings 66 and 72. The tilt rotational stiffness of the upper or lower tilt mechanism 62 or 64 is the resisting moment on the fitting 66 or 72 divided by the tilt angle. Increase in the weight load on the column increases the contact area and the deformation of the pads 70 and 74 by the fittings 66 and 72, due to the contoured ends 67 and 73 on the fittings 66 and 72, thereby increasing the tilt rotational stiffness of the upper and lower tilt mechanisms 62 and 64. By proper selection of the shape and material properties of the pads 70 and 74, and the contoured shapes 67 and 73 of the end fittings 66 and 72, the tilt rotational stiffness can be made approximately proportional to the weight load on the column. Various materials can be used for the pads. Examples are natural rubber, Neoprene and other rubber-like materials, metallic meshes and combinations of materials.

Figure 10:
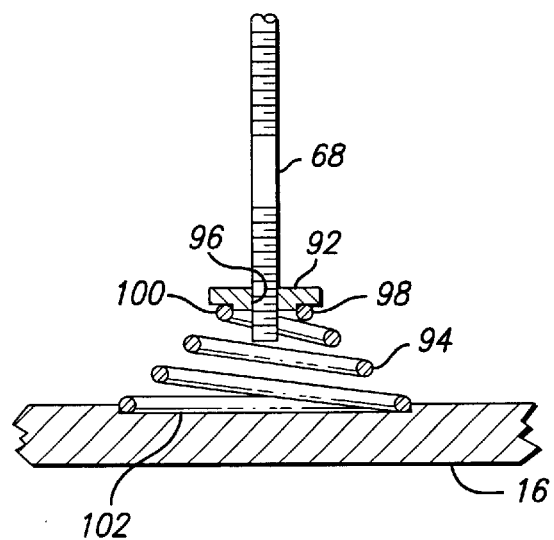
FIG. 10 is a cross-sectional side view of part of a column assembly and tilt mechanism of another embodiment of the present invention.

Referring now to FIG. 10, the lower tilt mechanism of another embodiment of a column assembly of the present invention is shown which is similar to that of FIG. 9. Here, the fitting 72 and pad 74 of the column assembly 60 of FIG. 9 are replaced by the fitting 92 and tapered coil spring 94 that is supported on the lower column plate 16. A similar fitting and tapered coil spring, not shown in FIG. 10, are also used for the tilt mechanism at the upper end of the column assembly in this embodiment and are connect to the upper column plate. The fitting 92 has a threaded hole 96 for the threaded rod 68 and a reduced-diameter section 98 that positions the fitting 92 within the small coil 100 of the spring 94. A recessed area 102 in the lower column plate 16 locates the tapered spring 94 on the lower column plate 16. Translation of the upper column plate 14 relative to the lower plate 16 causes tilt rotation of the column assembly and deformation of the tapered spring 94 that resists the tilt rotation and provides the tilt rotational stiffness. Increasing the weight load on column increases both the axial and the tilt rotational stiffness of the tapered spring 94 by causing the larger more flexible coils to progressively bottom out on adjacent coils or on the lower column pate 16. By proper design of the tapered springs, the tilt rotational stiffness can be made approximately proportional to the weight load on the column. The tapered spring design variables include the material, wire diameter, small coil diameter, large coil diameter, number of coils, free length, axial spacing of the coils and diameters of the coils.

Figure 11:
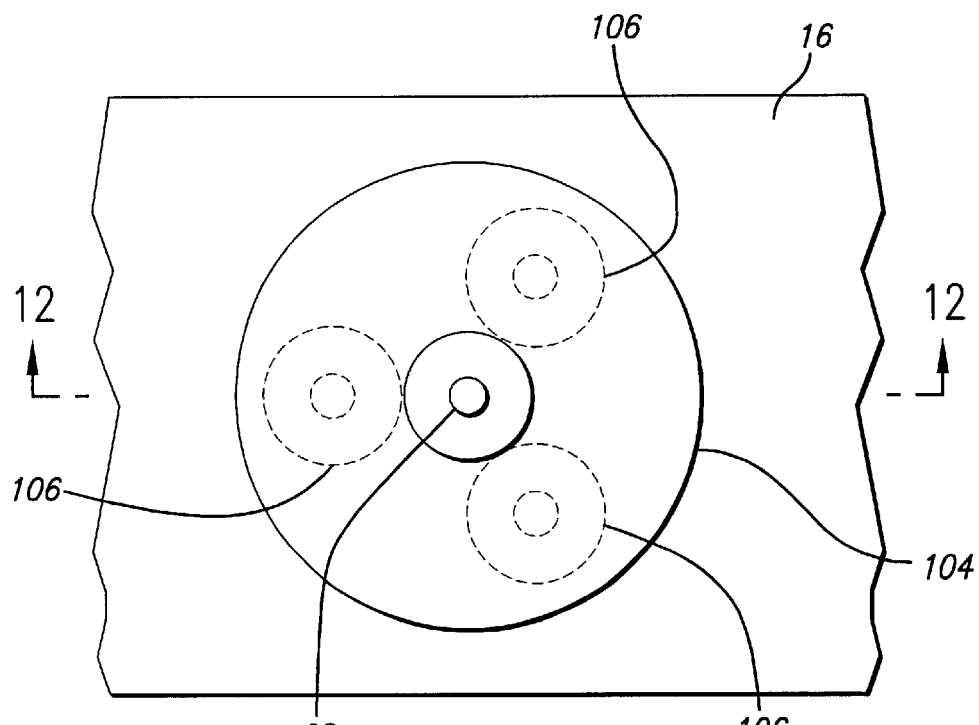
FIG. 11 is a plan view of the lower part of a column assembly and tilt mechanism of another embodiment of the present invention including a portion of the lower column plate.
Figure 12:
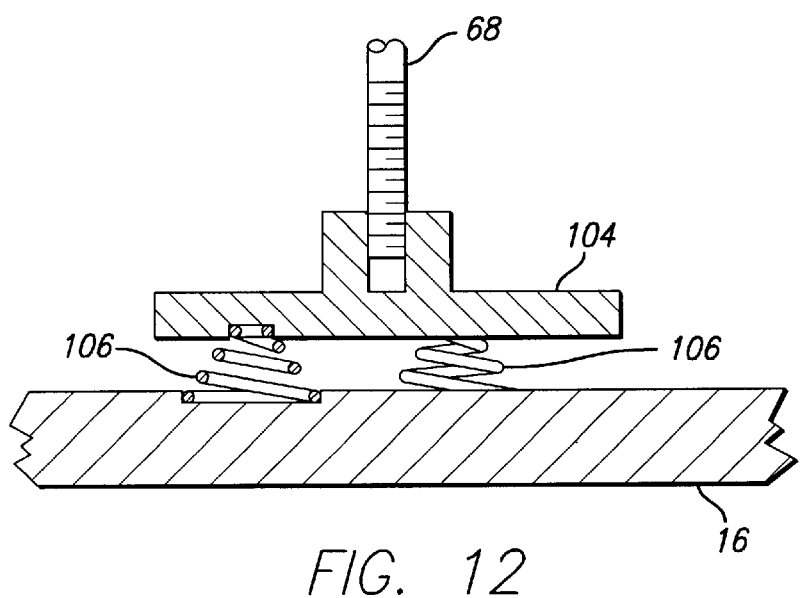
FIG. 12 is a cross-sectional side view of the lower part of the column assembly and tilt mechanism shown in FIG. 11.

Referring now to FIGS. 11 and 12, these figures show the lower tilt mechanism of another embodiment of the present invention, similar to that shown in FIG. 10, in which the fitting 92 and tapered spring 94 of FIG. 10 are replaced by the fitting 94 and three tapered coil springs 106 that are spaced apart at 120 degrees and are supported on the lower column plate 16. A similar fitting and tapered coil springs, not shown in FIGS. 11 and 12, are also used for the tilt mechanism at the upper end of the column assembly in this embodiment and are connect to the upper column plate. The column assembly of FIGS. 11 and 12 behaves similar to that of FIG. 10 except the tilt rotational stiffness is now due to the axial and tilt rotational stiffness of three tapered springs and their radial distance from the centerline of the column assembly. By proper selection of the radial position and design of the tapered springs 106, the tilt rotational stiffness can be made approximately proportional to the weight load on the column.

Other embodiments of the present invention similar to those of FIGS. 10, 11 and 12 can substitute other non-linear springs for the tapered coil springs used in the embodiments shown in these figures.

Further modifications and improvements may additionally be made to the device and method disclosed herein without departing from the scope of the present invention. Accordingly, it is not intended that the invention be limited, except as by the appended claims.

What is claimed is:

1. A horizontal-motion isolator having force-supporting capability in a vertical direction for supporting an object in an equilibrium position relative to a base while suppressing the transmission of horizontal vibratory motion between the object and the base, comprising:

a plurality of columns, each column having a rigid member with a first end and a second end; and a plurality of tilt mechanisms, each first end of the rigid members being operatively connected to the object by a tilt mechanism and each second end of the rigid members being operatively connected to the base by a tilt mechanism, wherein each tilt mechanism exhibits a tilt rotational stiffness and the horizontal translation of the object relative to the base causes tilt rotation of the columns, the tilt rotational stiffness of the tilt mechanisms being approximately proportional to the compression load transmitted to the columns by the weight of the object.

2. The horizontal-motion isolator of claim 1, wherein the horizontal spacing between the tilt mechanisms is adjustable so that the horizontal stiffness of the isolator and the horizontal natural frequencies of the system comprising the object and the isolator are adjustable.

3. The horizontal-motion isolator of claim 1, wherein each tilt mechanism comprises a plurality of tension members, wherein the tension members are stiff in axial tension and relatively flexible in bending and the compressive load on the column from the weight of the object produces tension loads in the tension members.

4. The horizontal-motion isolator of claim 3, wherein the tilt mechanisms comprise three or more tension members substantially equally spaced from each other.

5. The horizontal-motion isolator of claim 3, wherein each tension member makes a non-zero angle with the horizontal.

6. The horizontal-motion isolator of claim 3, wherein the tension members are formed from a structure selected from a group consisting of thin wire, string, filament, cable, thin and narrow strips of sheet metal and other structural sheet material.

7. The horizontal-motion isolator of claim 3, wherein the tension members of each tilt mechanism are integrally formed and connected with each other.

8. The horizontal-motion isolator of claim 7, wherein the integrally-formed tension members are formed from a material which has been stamped, laser machined, water jet machined or chemical milled.

9. The horizontal-motion isolator of claim 5, wherein the amount of tension in each tension member depends upon the angle which the tension member makes with the horizontal.

10. The horizontal-motion isolator of claim 1, wherein each tilt mechanism comprises a non-linear spring.

11. The horizontal-motion isolator of claim 10, wherein the non-linear spring is a tapered spring.

12. The horizontal-motion isolator of claim 1, wherein each tilt mechanism comprises a plurality of non-linear springs.

13. The horizontal-motion isolator of claim 12, wherein the non-linear springs are tapered springs.

14. The horizontal-motion isolator of claim 1, wherein each tilt mechanism comprises an end fitting pressed into a relatively deformable pad by the weight load on the column.

15. The horizontal-motion isolator of claim 14, wherein the end fitting of each tilt mechanism has a contoured shape so that as the weight load on the column increases, the contact area between the end fitting and the pad and the deformation of the pad increases.

16. The horizontal-motion isolator of claim 15, wherein the shape of each end fitting is conical.

17. The horizontal-motion isolator of claim 14, wherein the pad is made from a material selected from the group consisting of natural rubber, Neoprene, rubber-like materials and metallic meshes.

18. The horizontal-motion isolator of claim 14, wherein each end fitting is movable along the length of the rigid member to adjust the effective length of the column.

19. The horizontal-motion isolator of claim 1, wherein the length of the column is adjustable.

20. A horizontal-motion isolator having force-supporting capability in the vertical direction for supporting an object in an equilibrium position relative to a base while suppressing the transmission of horizontal vibratory motion between the object and the base, comprising:

an upper platform operatively connected to the object;

a lower platform operatively connected with the base;

a plurality of columns, each column having a rigid member with a first end and a second end, the first end of each rigid member being operatively coupled to the upper platform and the second end of each rigid member being operatively coupled to the lower platform;

a plurality of tilt mechanisms attached between the first end of each rigid member and the upper platform; and a plurality of tilt mechanisms attached between the second end of each rigid member and the lower platform, wherein each tilt mechanism exhibits a tilt rotational stiffness and the horizontal translation of the object relative to the base causes tilt rotation of the columns, the tilt rotational stiffness of the tilt mechanisms being approximately proportional to the compression load transmitted to the columns by the weight of the object.

* * * * *